US011975345B2

(12) United States Patent
Fritz et al.

(10) Patent No.: US 11,975,345 B2
(45) Date of Patent: May 7, 2024

(54) COATING INSTALLATION AND CORRESPONDING COATING METHOD

(71) Applicant: Dürr Systems AG, Bietigheim-Bissingen (DE)

(72) Inventors: Hans-Georg Fritz, Ostfildern (DE); Benjamin Wöhr, Eibensbach (DE); Marcus Kleiner, Besigheim (DE); Moritz Bubek, Ludwigsburg (DE); Timo Beyl, Besigheim (DE); Frank Herre, Oberriexingen (DE); Steffen Sotzny, Oberstenfeld (DE)

(73) Assignee: Dürr Systems AG, Bietigheim-Bissingen (DE)

( * ) Notice: Subject to any disclaimer, the term of this patent is extended or adjusted under 35 U.S.C. 154(b) by 0 days.

(21) Appl. No.: 17/740,537

(22) Filed: May 10, 2022

(65) Prior Publication Data

US 2022/0266285 A1 Aug. 25, 2022

Related U.S. Application Data

(62) Division of application No. 16/468,694, filed as application No. PCT/EP2017/081105 on Dec. 1, 2017, now abandoned.

(30) Foreign Application Priority Data

Dec. 14, 2016 (DE) ..................... 10 2016 014 953.1

(51) Int. Cl.
*B05B 13/04* (2006.01)
*B05D 7/14* (2006.01)
(Continued)

(52) U.S. Cl.
CPC ............ *B05B 13/0452* (2013.01); *B05D 7/14* (2013.01); *B05B 1/14* (2013.01); *B05B 13/0431* (2013.01); *B05D 1/02* (2013.01); *B05D 7/577* (2013.01)

(58) Field of Classification Search
None
See application file for complete search history.

(56) References Cited

U.S. PATENT DOCUMENTS 3,421,694 A 1/1969 Muller
3,717,306 A 2/1973 Hushon et al.
(Continued)

FOREIGN PATENT DOCUMENTS

CN 2287527 Y 8/1998
CN 1331661 A 1/2002
(Continued)

OTHER PUBLICATIONS

USPTO Non-Final Office Action in related U.S. Appl. No. 17/532,411 dated Jan. 13, 2023 (127 pages).
(Continued)

*Primary Examiner* — Michael P. Rodriguez
(74) *Attorney, Agent, or Firm* — Bejin Bieneman PLC

(57) ABSTRACT

The disclosure relates to a painting installation for painting components with a paint, in particular for painting motor vehicle body components, with a paint booth and an application device, in particular a print head, arranged in the paint booth, for applying the paint to the component located inside the paint booth, the application device operating essentially without overspray, so that the paint applied by the application device essentially completely on the component to be coated without overspray deposits. The disclosure provides that no paint separation is arranged below the first paint booth.

8 Claims, 11 Drawing Sheets

(51) Int. Cl.

| | |
|---|---|
| *B05B 1/14* | (2006.01) |
| *B05D 1/02* | (2006.01) |
| *B05D 7/00* | (2006.01) |

(56) References Cited

U.S. PATENT DOCUMENTS

| | | | |
|---|---|---|---|
| 3,981,320 | A | 9/1976 | Wiggins |
| 4,141,231 | A | 2/1979 | Kudlich |
| 4,375,865 | A | 3/1983 | Springer |
| 4,383,264 | A | 5/1983 | Lewis |
| 4,423,999 | A | 1/1984 | Choly |
| 4,430,010 | A | 2/1984 | Zrenner et al. |
| 4,435,719 | A | 3/1984 | Snaper |
| 4,478,241 | A | 10/1984 | Cardenas-Franco |
| 4,555,719 | A | 11/1985 | Arway et al. |
| 4,593,360 | A | 6/1986 | Cocks |
| 4,668,948 | A | 5/1987 | Merkel |
| 4,714,044 | A | 12/1987 | Kikuchi |
| 4,734,711 | A | 3/1988 | Piatt et al. |
| 4,826,135 | A | 5/1989 | Mielke |
| 4,894,252 | A | 1/1990 | Bongen et al. |
| 4,941,778 | A | 7/1990 | Lehmann |
| 4,974,780 | A | 12/1990 | Nakamura et al. |
| 4,985,715 | A | 1/1991 | Cyphert et al. |
| 5,050,533 | A | 9/1991 | Zaber |
| 5,072,881 | A | 12/1991 | Taube, III |
| 5,429,682 | A | 7/1995 | Harlow, Jr. |
| 5,435,884 | A | 7/1995 | Simmons et al. |
| 5,538,221 | A | 7/1996 | Joswig |
| 5,556,466 | A | 9/1996 | Martin et al. |
| 5,602,575 | A | 2/1997 | Pauly |
| 5,636,795 | A | 6/1997 | Sedgwick et al. |
| 5,647,542 | A | 7/1997 | Diana |
| 5,659,347 | A | 8/1997 | Taylor |
| 5,681,619 | A | 10/1997 | Ogasawara |
| 5,740,967 | A | 4/1998 | Simmons et al. |
| 5,843,515 | A | 12/1998 | Crum et al. |
| 5,951,882 | A | 9/1999 | Simmons et al. |
| 5,964,407 | A | 10/1999 | Sandkleiva |
| 5,976,343 | A | 11/1999 | Schlaak |
| 6,179,217 | B1 | 1/2001 | Yoshida et al. |
| 6,325,302 | B1 | 12/2001 | Guzowski |
| 6,540,835 | B2 | 4/2003 | Kim et al. |
| 6,607,145 | B1 | 8/2003 | Boriani et al. |
| 6,641,667 | B2 | 11/2003 | Ochiai et al. |
| 6,712,285 | B2 | 3/2004 | Provenaz et al. |
| 6,777,032 | B2 | 8/2004 | Ogasahara et al. |
| 6,811,807 | B1 | 11/2004 | Zimmermann et al. |
| 6,849,684 | B2 | 2/2005 | Poppe et al. |
| 7,160,105 | B2 | 1/2007 | Edwards |
| 7,178,742 | B2 | 2/2007 | Nellentine et al. |
| 7,182,815 | B2 | 2/2007 | Katagami et al. |
| 7,244,310 | B2 | 7/2007 | Edwards |
| 7,270,712 | B2 | 9/2007 | Edwards |
| 7,357,959 | B2 | 4/2008 | Bauer |
| 7,387,071 | B2 | 6/2008 | Heinke et al. |
| 7,449,070 | B2 | 11/2008 | Fellingham |
| 7,604,333 | B2 | 10/2009 | Horsnell |
| 7,757,632 | B2 | 7/2010 | Edwards |
| 7,837,071 | B2 | 11/2010 | Achrainer |
| 7,901,741 | B2 | 3/2011 | Katagami et al. |
| 8,028,651 | B2 | 10/2011 | Rademacher et al. |
| 8,118,385 | B2 | 2/2012 | Van De Wynckel et al. |
| 8,449,087 | B2 | 5/2013 | Kataoka et al. |
| 8,545,943 | B2 | 10/2013 | Frankenberger et al. |
| 8,652,581 | B2 | 2/2014 | Merchant |
| 8,678,535 | B2 | 3/2014 | Beier et al. |
| 8,875,655 | B2 | 11/2014 | Pettersson et al. |
| 8,882,242 | B2 | 11/2014 | Beier et al. |
| 9,010,899 | B2 | 4/2015 | Harjee et al. |
| 9,108,424 | B2 | 8/2015 | Wallsten et al. |
| 9,140,247 | B2 | 9/2015 | Herre et al. |
| 9,156,054 | B2 | 10/2015 | Ikushima |
| 9,266,353 | B2 | 2/2016 | Beier et al. |
| 9,393,787 | B2 | 7/2016 | Ikushima |
| 9,464,573 | B2 | 10/2016 | Remy et al. |
| 9,592,524 | B2 | 3/2017 | Fritz et al. |
| 9,701,143 | B2 | 7/2017 | Ikushima |
| 9,707,585 | B2 | 7/2017 | Reimert et al. |
| 9,844,792 | B2 | 12/2017 | Pettersson et al. |
| 9,901,945 | B2 | 2/2018 | Fehr et al. |
| 9,914,150 | B2 | 3/2018 | Pettersson et al. |
| 10,016,977 | B2 | 7/2018 | Stefani et al. |
| 10,105,946 | B2 | 10/2018 | Nakamura et al. |
| 10,150,304 | B2 | 12/2018 | Herre et al. |
| 10,252,552 | B2 | 4/2019 | Pitz et al. |
| 10,272,677 | B2 | 4/2019 | Stefani et al. |
| 10,464,095 | B2 | 11/2019 | Fritz |
| 10,532,569 | B2 | 1/2020 | Wallsten et al. |
| 10,814,643 | B2 | 10/2020 | Herre |
| 11,504,735 | B2 | 11/2022 | Fritz |
| 2001/0006392 | A1 | 7/2001 | Otsuki |
| 2001/0017085 | A1 | 8/2001 | Kubo et al. |
| 2001/0019340 | A1 | 9/2001 | Kubo et al. |
| 2002/0024544 | A1 | 2/2002 | Codos |
| 2002/0043280 | A1 | 4/2002 | Ochiai et al. |
| 2002/0043567 | A1 | 4/2002 | Provenaz et al. |
| 2002/0105688 | A1 | 8/2002 | Katagami et al. |
| 2002/0109741 | A1 | 8/2002 | Okabe et al. |
| 2002/0128371 | A1 | 9/2002 | Poppe et al. |
| 2003/0020783 | A1 | 1/2003 | Sanada |
| 2003/0041884 | A1 | 3/2003 | Bahr |
| 2003/0049383 | A1 | 3/2003 | Ogasahara et al. |
| 2003/0063154 | A1 | 4/2003 | Goto |
| 2004/0028830 | A1 | 2/2004 | Bauer |
| 2004/0089234 | A1 | 5/2004 | Hagglund et al. |
| 2004/0107900 | A1 | 6/2004 | Clifford et al. |
| 2004/0123159 | A1 | 6/2004 | Kerstens |
| 2004/0173144 | A1 | 9/2004 | Edwards |
| 2004/0221804 | A1 | 11/2004 | Zimmermann et al. |
| 2004/0231594 | A1 | 11/2004 | Edwards |
| 2004/0238522 | A1 | 12/2004 | Edwards |
| 2004/0256501 | A1 | 12/2004 | Mellentine et al. |
| 2004/0261700 | A1 | 12/2004 | Edwards |
| 2005/0000422 | A1 | 1/2005 | Edwards |
| 2005/0015050 | A1 | 1/2005 | Mowery et al. |
| 2005/0016451 | A1 | 1/2005 | Edwards |
| 2005/0023367 | A1 | 2/2005 | Reighard et al. |
| 2005/0156963 | A1 | 7/2005 | Song et al. |
| 2005/0243112 | A1 | 11/2005 | Kobayashi et al. |
| 2006/0061613 | A1 | 3/2006 | Fienup et al. |
| 2006/0068109 | A1 | 3/2006 | Frankenberger et al. |
| 2006/0146379 | A1 | 7/2006 | Katagami et al. |
| 2006/0238587 | A1 | 10/2006 | Horsnell |
| 2006/0251796 | A1 | 11/2006 | Fellingham |
| 2007/0062383 | A1 | 3/2007 | Gazeau |
| 2007/0292626 | A1 | 12/2007 | Larsson et al. |
| 2008/0271674 | A1 | 11/2008 | Rademarcher |
| 2008/0309698 | A1 | 12/2008 | Nakano et al. |
| 2009/0027433 | A1 | 1/2009 | Van De Wynckel et al. |
| 2009/0029069 | A1 | 1/2009 | Edwards |
| 2009/0117283 | A1 | 5/2009 | Herre |
| 2009/0181182 | A1 | 7/2009 | Sloan |
| 2009/0244216 | A1 | 10/2009 | Niimi |
| 2010/0132612 | A1 | 6/2010 | Achrainer |
| 2010/0156970 | A1 | 6/2010 | Ikushima |
| 2010/0170918 | A1 | 7/2010 | Achrainer |
| 2010/0225685 | A1 | 9/2010 | Kwon et al. |
| 2010/0279013 | A1 | 11/2010 | Frankenberger et al. |
| 2010/0282283 | A1 | 11/2010 | Bauer |
| 2010/0321448 | A1 | 12/2010 | Buestgens et al. |
| 2011/0014371 | A1 | 1/2011 | Herre et al. |
| 2011/0084150 | A1 | 4/2011 | Merchant |
| 2011/0248046 | A1 | 10/2011 | Simion |
| 2011/0262622 | A1* | 10/2011 | Herre ..................... B05C 5/027 118/712 |
| 2012/0085842 | A1 | 4/2012 | Ciardella |
| 2012/0105522 | A1 | 5/2012 | Wallsten |
| 2012/0114849 | A1 | 5/2012 | Melcher |
| 2012/0162331 | A1 | 6/2012 | Kataoka |
| 2012/0186518 | A1 | 7/2012 | Herre |
| 2012/0219699 | A1 | 8/2012 | Pettersson et al. |
| 2012/0249679 | A1 | 10/2012 | Beier et al. |
| 2012/0282405 | A1 | 11/2012 | Herre |

(56) References Cited

U.S. PATENT DOCUMENTS

| | | | |
|---|---|---|---|
| 2013/0201243 A1 | 8/2013 | Yoshida | |
| 2013/0215203 A1 | 8/2013 | Chen | |
| 2013/0257984 A1 | 10/2013 | Beier et al. | |
| 2013/0284833 A1 | 10/2013 | Fritz et al. | |
| 2014/0076985 A1 | 3/2014 | Pettersson et al. | |
| 2014/0120457 A1 | 5/2014 | Choi | |
| 2014/0242285 A1 | 8/2014 | Pettersson et al. | |
| 2014/0329001 A1 | 11/2014 | Rouaud et al. | |
| 2015/0009254 A1 | 1/2015 | Kaiba et al. | |
| 2015/0042716 A1 | 2/2015 | Beier et al. | |
| 2015/0086723 A1 | 3/2015 | Bustgens | |
| 2015/0098028 A1 | 4/2015 | Ohnishi | |
| 2015/0328654 A1 | 11/2015 | Scwab | |
| 2015/0375258 A1 | 12/2015 | Fritz et al. | |
| 2015/0375507 A1 | 12/2015 | Ikushima | |
| 2016/0001322 A1* | 1/2016 | Fritz | B05D 7/574 428/142 |
| 2016/0052312 A1 | 2/2016 | Pitz et al. | |
| 2016/0074822 A1 | 3/2016 | Han | |
| 2016/0288552 A1 | 10/2016 | Ikushima | |
| 2016/0306364 A1 | 10/2016 | Ikushima et al. | |
| 2017/0087837 A1 | 3/2017 | Stefani et al. | |
| 2017/0106393 A1 | 4/2017 | Hamspon et al. | |
| 2017/0128962 A1 | 5/2017 | Kashiyama et al. | |
| 2017/0136481 A1 | 5/2017 | Fritz et al. | |
| 2017/0252765 A1 | 9/2017 | Medard et al. | |
| 2017/0267002 A1 | 9/2017 | Pitz et al. | |
| 2017/0299088 A1 | 10/2017 | Rau | |
| 2017/0361346 A1 | 12/2017 | Lahidjanian et al. | |
| 2018/0022105 A1 | 1/2018 | Nakamura et al. | |
| 2018/0056670 A1 | 3/2018 | Kerr | |
| 2018/0093491 A1 | 4/2018 | Murayama et al. | |
| 2018/0178505 A1 | 6/2018 | Stefani et al. | |
| 2018/0222186 A1 | 8/2018 | Stefani et al. | |
| 2018/0250955 A1 | 9/2018 | Herre | |
| 2019/0091712 A1 | 3/2019 | Medard et al. | |

FOREIGN PATENT DOCUMENTS

| | | | |
|---|---|---|---|
| CN | 1411914 | A | 4/2003 |
| CN | 1438942 | A | 8/2003 |
| CN | 1512919 | A | 7/2004 |
| CN | 1176815 | C | 11/2004 |
| CN | 1668386 | A | 9/2005 |
| CN | 1761530 | A | 4/2006 |
| CN | 101264698 | A | 9/2008 |
| CN | 101309755 | A | 11/2008 |
| CN | 101657264 | A | 2/2010 |
| CN | 101784348 | A | 7/2010 |
| CN | 102177002 | A | 9/2011 |
| CN | 102198434 | A | 9/2011 |
| CN | 102971080 | A | 3/2013 |
| CN | 103153483 | A | 6/2013 |
| CN | 103909743 | A | 7/2014 |
| CN | 104613205 | A | 5/2015 |
| CN | 104994966 | A | 10/2015 |
| CN | 105358259 | A | 2/2016 |
| CN | 205042649 | U | 2/2016 |
| CN | 106414081 | A | 2/2017 |
| DE | 1284250 | A | 11/1968 |
| DE | 7710895 | U1 | 9/1977 |
| DE | 3045401 | A1 | 7/1982 |
| DE | 3221327 | A1 | 9/1983 |
| DE | 3225554 | A1 | 1/1984 |
| DE | 3634747 | A1 | 8/1987 |
| DE | 3804092 | A1 | 9/1988 |
| DE | 4013322 | A1 | 10/1991 |
| DE | 4115111 | A1 | 11/1991 |
| DE | 4138491 | A1 | 5/1993 |
| DE | 9405600 | U1 | 6/1994 |
| DE | 68924202 | T2 | 2/1996 |
| DE | 19606716 | C1 | 8/1997 |
| DE | 19630290 | A1 | 1/1998 |
| DE | 19731829 | A1 | 1/1999 |
| DE | 19743804 | A1 | 4/1999 |
| DE | 9422327 | U1 | 3/2000 |
| DE | 19852079 | A1 | 5/2000 |
| DE | 19936790 | A1 | 2/2001 |
| DE | 20017629 | U1 | 3/2001 |
| DE | 10048749 | A1 | 4/2002 |
| DE | 69429354 | T2 | 5/2002 |
| DE | 69622407 | T2 | 3/2003 |
| DE | 10307719 | A1 | 9/2003 |
| DE | 60001898 | T2 | 2/2004 |
| DE | 102004021223 | A1 | 12/2004 |
| DE | 10331206 | A1 | 1/2005 |
| DE | 102004034270 | A1 | 2/2006 |
| DE | 102004044655 | A1 | 3/2006 |
| DE | 102004049471 | A1 | 4/2006 |
| DE | 60212523 | T2 | 2/2007 |
| DE | 69836128 | T2 | 8/2007 |
| DE | 60125369 | T2 | 10/2007 |
| DE | 102006021623 | A1 | 11/2007 |
| DE | 102006056051 | A1 | 5/2008 |
| DE | 102007018877 | A1 | 10/2008 |
| DE | 60132100 | T2 | 12/2008 |
| DE | 102007037663 | A1 | 2/2009 |
| DE | 10 2008 018 881 | A1 | 9/2009 |
| DE | 102008053178 | A1 | 5/2010 |
| DE | 102009029946 | A1 | 12/2010 |
| DE | 102009038462 | A1 | 3/2011 |
| DE | 102010004496 | A1 | 7/2011 |
| DE | 102010019612 | A1 | 11/2011 |
| DE | 102012006371 | A1 | 7/2012 |
| DE | 102012005087 | A1 | 10/2012 |
| DE | 102012005650 | A1 | 9/2013 |
| DE | 102012212469 | A | 1/2014 |
| DE | 102012109123 | A1 | 3/2014 |
| DE | 202013101134 | U1 | 6/2014 |
| DE | 102013002412 | A1 | 8/2014 |
| DE | 102013011107 | A1 | 8/2014 |
| DE | 102013205171 | A1 | 9/2014 |
| DE | 102014006991 | A1 | 12/2014 |
| DE | 102014007523 | A1 | 11/2015 |
| DE | 102014008183 | A1 | 12/2015 |
| DE | 10 2014 217 892 | A1 | 3/2016 |
| DE | 102014012705 | A1 | 3/2016 |
| DE | 102014013158 | A1 | 3/2016 |
| DE | 10 2016 014 952 | A1 | 6/2018 |
| EP | 0138322 | A1 | 4/1985 |
| EP | 0297309 | A2 | 1/1989 |
| EP | 0665106 | A2 | 8/1995 |
| EP | 1120258 | A2 | 8/2001 |
| EP | 1270086 | A1 | 1/2003 |
| EP | 1764226 | A1 | 3/2007 |
| EP | 1852733 | A1 | 11/2007 |
| EP | 1884365 | A1 | 2/2008 |
| EP | 1946846 | A2 | 7/2008 |
| EP | 2002898 | A1 | 12/2008 |
| EP | 2133154 | A2 | 12/2009 |
| EP | 2151282 | A1 | 2/2010 |
| EP | 2196267 | A2 | 6/2010 |
| EP | 2380744 | A2 | 10/2011 |
| EP | 2433716 | A1 | 3/2012 |
| EP | 2468512 | A1 | 6/2012 |
| EP | 2641661 | A1 | 9/2013 |
| EP | 2644392 | A2 | 10/2013 |
| EP | 2777938 | A1 | 9/2014 |
| EP | 2799150 | A1 | 11/2014 |
| EP | 2842753 | A1 | 3/2015 |
| EP | 3002128 | A2 | 4/2016 |
| EP | 3156138 | A1 | 4/2017 |
| EP | 3213823 | A1 | 9/2017 |
| EP | 3257590 | A1 | 12/2017 |
| EP | 3272669 | A1 | 1/2018 |
| EP | 3068626 | B1 | 10/2019 |
| FR | 3010918 | A1 | 3/2015 |
| GB | 2200433 | A | 8/1988 |
| GB | 2367771 | A | 4/2002 |
| GB | 2507069 | A | 4/2014 |
| JP | S5722070 | A | 2/1982 |
| JP | S62116442 | A | 5/1987 |
| JP | H04-106669 | U | 9/1992 |

(56) References Cited

FOREIGN PATENT DOCUMENTS

| | | | | |
|---|---|---|---|---|
| JP | H0798171 | B2 | 10/1995 | |
| JP | H09192583 | A | 7/1997 | |
| JP | 2011206958 | A | 6/2000 | |
| JP | 2000317354 | A | 11/2000 | |
| JP | 2001129456 | A | 5/2001 | |
| JP | 2001157863 | A | 6/2001 | |
| JP | 2001239652 | A | 9/2001 | |
| JP | 2001300404 | A | 10/2001 | |
| JP | 2005501745 | A | 1/2002 | |
| JP | 2002361863 | A | 12/2002 | |
| JP | 2003506210 | A | 2/2003 | |
| JP | 2003136030 | A | 5/2003 | |
| JP | 2003164780 | A | 6/2003 | |
| JP | 2004142382 | A | 5/2004 | |
| JP | 2004528956 | A | 9/2004 | |
| JP | 2004337710 | A | 12/2004 | |
| JP | 2000158670 | A | 9/2005 | |
| JP | 2005526234 | A | 9/2005 | |
| JP | 2007021760 | A | 2/2007 | |
| JP | 2007152666 | A | 6/2007 | |
| JP | 2007520340 | A | 7/2007 | |
| JP | 2007245633 | A | 9/2007 | |
| JP | 2007289848 | A | 11/2007 | |
| JP | 2008110332 | A | 5/2008 | |
| JP | 2009006324 | A | 1/2009 | |
| JP | 2010528852 | A | 8/2010 | |
| JP | 2010531213 | A | 9/2010 | |
| JP | 2010531729 | A | 9/2010 | |
| JP | 2010241003 | A | 10/2010 | |
| JP | 2012011310 | A | 1/2012 | |
| JP | 2012506305 | A | 3/2012 | |
| JP | 2012135925 | A | 7/2012 | |
| JP | 2012206116 | A | 10/2012 | |
| JP | 2012228643 | A | 11/2012 | |
| JP | 2012228660 | | 11/2012 | |
| JP | 2013067179 | A | 4/2013 | |
| JP | 2013530816 | A | 8/2013 | |
| JP | 2013188706 | A | 9/2013 | |
| JP | 2014019140 | A | 2/2014 | |
| JP | 2014050832 | A | 3/2014 | |
| JP | 2014111307 | A | 6/2014 | |
| JP | 2015-009222 | A | 1/2015 | |
| JP | 2015027636 | A | 2/2015 | |
| JP | 2015096322 | A | 5/2015 | |
| JP | 2015520011 | A | 7/2015 | |
| JP | 2015193129 | A | 11/2015 | |
| JP | 2015535735 | A | 12/2015 | |
| JP | 2016507372 | A | 3/2016 | |
| JP | 2016526910 | A | 9/2016 | |
| JP | 2016175077 | A | 10/2016 | |
| JP | 2016175662 | A | 10/2016 | |
| JP | 2018012065 | A | 1/2018 | |
| JP | 2020513311 | A | 5/2020 | |
| JP | 2020513314 | A | 5/2020 | |
| WO | 8601775 | A1 | 3/1986 | |
| WO | 9856585 | A1 | 12/1998 | |
| WO | 02098576 | A1 | 12/2002 | |
| WO | 2003021519 | A1 | 3/2003 | |
| WO | 2003062129 | A2 | 7/2003 | |
| WO | 2004048112 | A1 | 6/2004 | |
| WO | 2004085738 | A2 | 10/2004 | |
| WO | 2005016556 | A1 | 2/2005 | |
| WO | 2005075170 | A1 | 8/2005 | |
| WO | 2006022217 | A1 | 3/2006 | |
| WO | 2007121905 | A1 | 11/2007 | |
| WO | 2009019036 | A1 | 2/2009 | |
| WO | 2010046064 | A1 | 4/2010 | |
| WO | 2010146473 | A1 | 12/2010 | |
| WO | 2011044491 | A1 | 4/2011 | |
| WO | 2011128439 | A1 | 10/2011 | |
| WO | 2011138048 | A1 | 11/2011 | |
| WO | 2013121565 | A1 | 8/2013 | |
| WO | 2014121916 | A1 | 8/2014 | |
| WO | WO-2014121927 | A1 * | 8/2014 | ............... B05D 1/02 |
| WO | 2015071270 | A1 | 5/2015 | |
| WO | 2015096322 | A1 | 7/2015 | |
| WO | 2015186014 | A1 | 12/2015 | |
| WO | 2016-087016 | A1 | 6/2016 | |
| WO | 2016142510 | A1 | 9/2016 | |
| WO | 2016145000 | A1 | 9/2016 | |
| WO | 2017006245 | A1 | 1/2017 | |
| WO | 2017006246 | A1 | 1/2017 | |
| WO | 2018102846 | A1 | 6/2018 | |
| WO | 2018108565 | A1 | 6/2018 | |

OTHER PUBLICATIONS

Final Office Action dated Jun. 11, 2021 for U.S. Appl. No. 16/468,701 (64 pages).
Chinese Office Action for Application No. CN20178007017.9 dated Aug. 31, 2020 (8 pages; with English translation).
Non Final Office Action for U.S. Appl. No. 16/468,697 dated Oct. 22, 2020 (78 pages).
Non Final Office Action for U.S. Appl. No. 16/468,696 dated Nov. 2, 2020 (58 pages).
Non Final Office Action for U.S. Appl. No. 16/468,689 dated Oct. 15, 2020 (77 pages).
Chinese Office Action for CN201780077476.7 dated Sep. 23, 2020 (12 pages; English translation not available).
Non Final Office Action for U.S. Appl. No. 16/468,700 dated Dec. 1, 2020 (73 pages).
Final Office Action dated Mar. 19, 2021 for U.S. Appl. No. 16/468,696 (45 pages).
Non-Final Office Action dated Nov. 23, 2021 for U.S. Appl. No. 16/468,694 (25 pages).
Non-Final Office Action for related U.S. Appl. No. 16/468,699 dated Mar. 9, 2022 (180 pages).
JPO Decision to Grant in related application No. JP2019-532030 dated Feb. 1, 2022 (6 pages; English machine translation provided).
Non-Final Office Action dated Dec. 24, 2021 for related U.S. Appl. No. 16/468,693 (19 pages).
Non-Final Office Action dated Jan. 6, 2022 for related U.S. Appl. No. 16/468,701 (36 pages).
JPO Decision to Grant in related application JP2019-532012 dated Jan. 25, 2022 (6 pages; with English machine translation).
Chinese Office Action in related application No. CN201780077045.0 dated Jan. 29, 2022 (17 pages; English machine translation provided).
Final Office Action dated Aug. 17, 2022 for U.S. Appl. No. 16/468,699 (26 pages).
Non-Final Office Action dated Dec. 13, 2022 in related U.S. Appl. No. 16/468,699 (21 pages).
Ghasem, G. et al; "Chapter 2 Background on Sprays and Their Production", Industrial Sprays and Atomization: Design, Analysis and Applications, Jan. 1, 2002, Springer, London, pp. 7-33, XP009195118, ISBN: 978-1-4471-3816-7.
International Search Report and Written Opinion for PCT/EP2017/081141 dated Feb. 26, 2018 (17 pages; with English translation).
International Search Report and Written Opinion for PCT/EP2017/081114 dated May 15, 2018 (33 pages; with English translation).
Anonymous: "Roboterkalibrierung—Wikipedia", Nov. 7, 2016, XP055471615, Gefunden im Internet: URL: https://de.wikipedia.org/w/index.php?title=Roboterkalibrierung&oldid=159460756 [gefunden am Apr. 30, 2018] das ganze dockument (8 pages; with English translation).
Beyer, Lukas: "Genauigkeitssteigerung von Industrierobotern", Forschungsberichte Aus Dem Laboratorium Fertigungstechnik/Helmut-Schmidt-Universitat, Universitat Der Bundeswehr Hamburg, Dec. 31, 2005, Seiten 1-4, XP009505118; ISSN: 1860-2886; ISBN: 978-3-8322-3681-6 (13 pages; with English machine translation).
International Search Report and Written Opinion for PCT/EP2017/081108 dated Feb. 28, 2018 (with English translation; 18 pages).
International Search Report and Written Opinion for PCT/EP2017/081099 dated Feb. 26, 2018 (21 pages; with English translation).
International Search Report and Written Opinion for PCT/EP2017/081102 dated Mar. 14, 2018 (16 pages; with English translation).

(56) References Cited

OTHER PUBLICATIONS

International Search Report and Written Opinion for PCT/EP2017/081105 dated Feb. 26, 2018 (19 pages; with English translation).
International Search Report and Written Opinion for PCT/EP2017/081152 dated May 15, 2018 (25 pages; with English translation).
International Search Report and Written Opinion for PCT/EP2017/081098 dated May 14, 2018 (26 pages; with English translation).
International Search Report and Written Opinion for PCT/EP2017/081101 dated Feb. 28, 2018 (14 pages; with English translation).
International Search Report and Written Opinion for PCT/EP2017/081121 dated Feb. 26, 2018 (20 pages; with English translation).
International Search Report and Written Opinion for PCT/EP2017/081117 dated Mar. 12, 2018 (27 pages; with English translation).
International Search Report and Written Opinion for PCT/EP2017/081123 dated Feb. 26, 2018 (20 pages; with English translation).
JPO Submission for JP2019-531096; submitted Dec. 21, 2020 (32 pages; with English translation).
JPO Submission for JP2019-531957; submitted Dec. 21, 2020 (21 pages; with English translation).
Japenese Patent Office Notice of Reasons of Refusal for Application No. JP 2019-531967 dated Jun. 8, 2021 (8 pages; with English machine translation).
Notification of Reasons for Refusal for Application No. JP2019-532012 dated Jun. 22, 2021 (6 pages; with English machine translation).
Notification of Reasons for Refusal for Application No. JP2019-527330 dated Jun. 22, 2021 (10 pages; with English machine translation).
Chinese Office Action dated Jun. 2, 2021 for Application No. CN201780077017.9 (17 pages; with English machine translation).
Japanese Notification of Reasons for Rejection dated Jun. 1, 2021 for Application No. JP2019-531944 (14 pages; with English machine translation).
Japanese Notification of Reasons for Rejection dated Jun. 8, 2021 for Application No. JP2019-531957 (13 pages; with English machine translation).
Supplemental Notice of Allowability dated Jul. 8, 2021 for U.S. Appl. No. 16/468,696 (11 pages).
Liptak, Bela. (2006). Instrument Engineers' Handbook (4th Edition)—Process Control and Optimization, vol. 2—2.1.3.5 Process Time Constant, (pp. 99-102). Taylor & Francis. Retrieved from https://app.knovel.eom/hotlink/pdf/id:kt00CC7HL1/instrument-engineers/process-time-constant (Year: 2006).
JPO Office Action for Application No. JP2019-531097 dated Jun. 29, 2021 (10 pages; with English machine translation).
JPO Office Action for Application No. 2019-531096 dated Jul. 6, 2021 (9 pages; with English machine translation).
JPO Office Action for Application No. 2019-531098 dated Jul. 6, 2021 (5 pages; English translation only).
JPO Office Action for Application No. 2019-531459 dated Jul. 6, 2021 (8 pages; with English machine translation).
JPO Office Action dated Jul. 13, 2021 for Application No. JP2019-532024 (12 pages; with English machine translation).
Non-Final Office Action dated Aug. 27, 2021 for U.S. Appl. No. 16/468,695 (149 pages).
JPO Notification of Reasons for Rejection for Application No. JP2019-532030 dated May 18, 2021 (6 pages; with English translation).
CIPO Office Action for Application No. CN201780077474.8 dated Apr. 26, 2021 (17 pages; with English translation).
Notice of Allowance mailed in U.S. Appl. No. 16/468,689 dated Jun. 2, 2021 (38 pages).
Non-Final Office Action dated Feb. 5, 2021 for U.S. Appl. No. 16/468,701 (80 pages).
Non-Final Office Action dated Feb. 18, 2021 for U.S. Appl. No. 16/468,692 (97 pages).
Final Office Action dated May 13, 2021 for U.S. Appl. No. 16/468,691 (70 pages).
JPO Decision to Grant dated Oct. 5, 2021 for Application No. JP2019-532113 (7 pages; with English machine translation).
Final Office Action dated Oct. 7, 2021 for U.S. Appl. No. 16/468,693 (58 pages).
Non-Final Office Action for U.S. Appl. No. 16/468,691 dated Jan. 7, 2021 (79 pages).
China National Intellectual Property Administration Office Action and Search Report for CN Application No. 201780077018.3 dated Aug. 27, 2020 (11 pages; Search Report in English).
Chinese Office Action and Search Report for CN201780077603.3 dated Oct. 12, 2020 (15 pages; English translation not available).
European Search Report for EP20170638.9 dated Sep. 14, 2020 (4 pages—English translation not available).
European Search Report for EP20170021.8 dated Sep. 8, 2020 (11 pages—English translation not available).
European Search Report for EP20170025.9 dated Sep. 9, 2020 (4 pages—English translation not available).
European Search Report for EP20170016.8 dated Sep. 7, 2020 (4 pages—English translation not available).
EPO Examination Report for Application No. 201702818.1 dated Dec. 18, 2020 (with English machine translation; 6 pages).
EPO Official Notification of Opposition for Application No. 17821803.8 dated Feb. 10, 2021 (64 pages; with English machine translation).
Non-Final Office Action dated Apr. 28, 2021 for U.S. Appl. No. 16/468,693 (109 pages).
Final Office Action dated Apr. 19, 2021 for U.S. Appl. No. 16/468,700 (62 pages).
EPO Notification of Objection dated May 18, 2022 for Patent No. EP3718643, related to related application No. U.S. Appl. No. 16/468,693 (55 pages; with English machine translation).
USPTO Non-Final Office Action dated Jun. 26, 2023 for related U.S. Appl. No. 17/965,062 (85 pages).
Huo Lijiang, "Packaging Printing Technology", 1st edition, pp. 321-323, Printing Industry Press, Sep. 30, 2011 (10 pages; with English machine translation).
Chinese Patent Office—Office Action for Application No. CN202211512023.1 dated Aug. 16, 2023 (26 pages; with English machine translation).

* cited by examiner

State of the art

COATING INSTALLATION AND CORRESPONDING COATING METHOD

CROSS-REFERENCE TO RELATED APPLICATIONS

This application is a divisional of, and claims priority to U.S. patent application Ser. No. 16/468,694, filed on Jun. 12, 2019, which is a national stage of, and claims priority to, Patent Cooperation Treaty Application No. PCT/EP2017/081105, filed on Dec. 1, 2017, which application claims priority to German Application No. DE 10 2016 014 953.1, filed on Dec. 14, 2016, which applications are hereby incorporated herein by reference in their entireties.

BACKGROUND

The disclosure concerns a painting installation for the painting of components with a paint, in particular for the painting of car body components. Furthermore, the disclosure concerns a corresponding painting process.

In modern painting installations for the painting of car body components, atomizers (e.g. rotary atomizers, air atomizers, airmix atomizers, airless atomizers, etc.) are usually used as application devices, which emit a spray of the paint to be applied. A disadvantage of these well-known atomizers is the fact that only part of the applied paint deposits on the surface of the vehicle body components to be coated, while the rest of the applied paint has to be disposed of as so-called overspray or is deposited on other areas of the component to be coated where no paint is to be deposited. For this purpose, a so-called paint separation system is located under the actual paint booth, which removes the unwanted overspray from the downward flowing booth air.

FIG. 1 shows a schematic cross-sectional view through a conventional painting installation with a paint booth 1 on an upper floor 2 and a paint separation 3 on a lower floor 4. The construction of the painting installation with the two floors 2, 4 one above the other requires a steel construction 5 or alternatively a concrete ceiling with a cut-out to lift the paint booth above the level of the paint separation 3, so that the air flowing downwards from the paint booth 1 can enter the paint separation 3 through the grid floor, as schematically indicated by the arrows. In paint booth 1, a conveyor 6 runs at right angles to the drawing plane, with the conveyor 6 conveying the vehicle body components to be painted through the painting installation at right angles to the drawing plane. Multi-axis painting robots 8 are arranged on both sides of the conveyor 6, each of which guides a rotary atomizer 9 as an application device. An example of the design and construction of the paint separation 3 is described in DE 20 2006 021 158 U1. It should also be mentioned that the steel structure 5 rests on a concrete foundation 10.

A main disadvantage of this well-known structure of a painting installation is the fact that paint separation 3 is necessary at all, since the paint separation 3 requires water, chemicals, stone flour and/or cardboard filters.

Another disadvantage of this well-known structure of a painting installation is the fact that the steel structure 5 is required to support the paint booth 1 and to position it above paint separation 3.

With regard to the technical background of the disclosure, reference is also made to DE 10 2010 019 612 A1, DE 197 31 829 A1, DE 602 12 523 T2, DE 94 22 327 U1, DE 10 2013 002 412 A1, DE 196 30 290 A1, DE 41 15 111 A1 and DE 196 06 716 C1.

DETAILED DESCRIPTION

Figure 1:
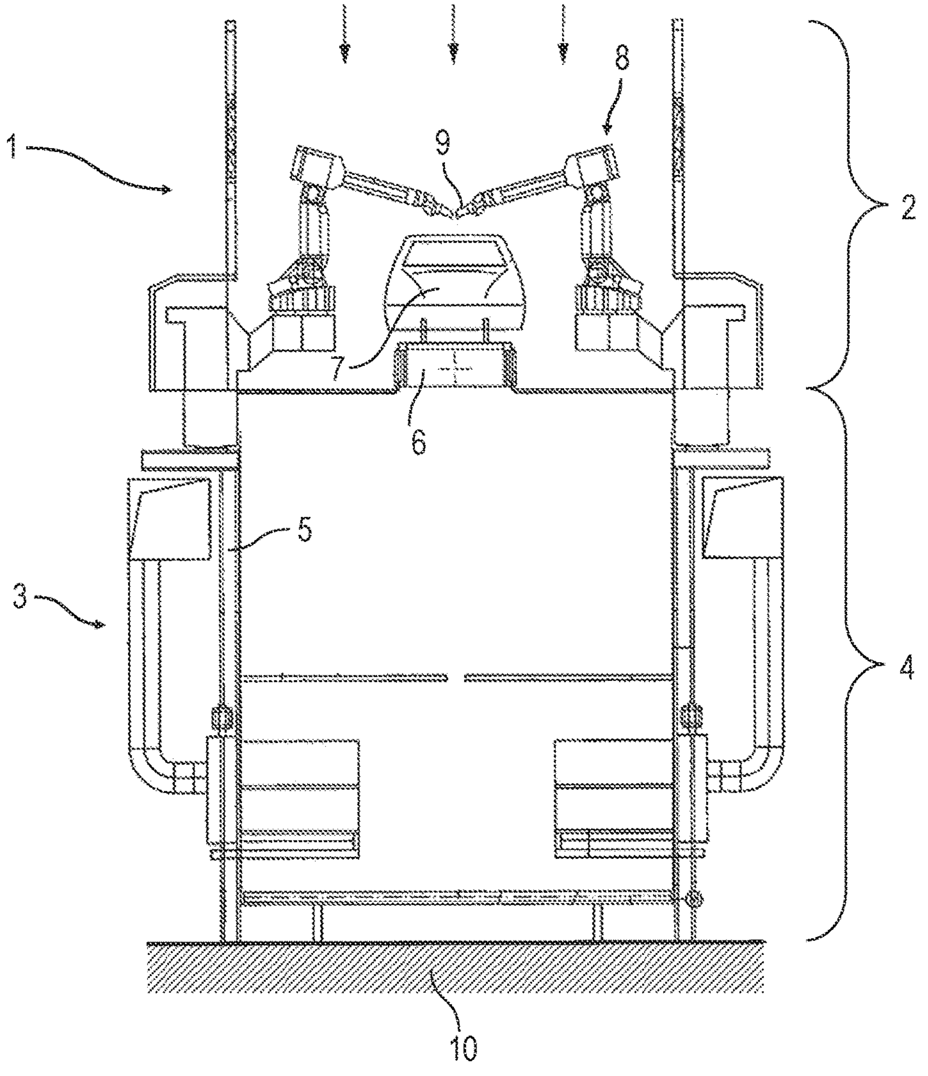
FIG. 1 a cross-sectional view through a conventional painting installation with a paint separation under the paint booth, FIG. 2A a cross-sectional view through a paint booth according to the disclosure, FIG. 2B a modification of FIG. 2A, FIG. 2C a modification of FIG. 2A.

The disclosure is therefore based on the task of creating a correspondingly improved painting installation and a corresponding painting method.

The painting installation according to the disclosure first has at least one first paint booth in which the components to be painted are painted by an application device. Here, however, a rotary atomizer is not used as the application device—as in the conventional structure of a painting installation described at the beginning and shown in FIG. 1—but rather a print head which essentially works without overspray, so that the paint applied by the application device is deposited essentially completely on the component to be coated without overspray.

Such printheads are known from the state of the art and are described for example in DE 10 2013 002 412 A1, U.S. Pat. No. 9,108,424 B2 and DE 10 2010 019 612 A1. However, the term “printhead” used in the disclosure is to be understood generally and is not limited to the specific printheads described in the above publications. Rather, the term “print head” used in the context of the disclosure merely serves to distinguish between atomizers that emit a spray of the paint to be applied. In contrast, a print head according to the disclosure emits a spatially narrowly limited jet of coating medium, which can be formed either as a droplet jet or as a jet of coating medium, which is continuous in the longitudinal direction of the jet.

For the first time, the disclosure provides for the elimination of the time-consuming separation of paint under the first paint booth. However, the disclosure does not only claim protection for painting installations where all paint booths are designed without an associated paint separation. Rather, the disclosure also claims protection for a painting installation with several paint booths, whereby at least one of the paint booths works with an overspray-free print head as an application device and therefore has no associated paint separation, while the other paint booths can rather use conventional atomizers (e.g. rotary atomizers) as an application device.

The combination of overspray-free print heads with overspray-generating atomizers in a painting line is advantageous because, for example, so-called wrap-around component edges are difficult to paint with the currently known print heads. It therefore makes sense to continue painting these areas (e.g. wrap-around component edges) with conventional atomizers (e.g. rotary atomizers). The wrap-around creates the layer of paint produced during electrostatic painting, which is deposited in the effective area of the field lines, which could not be coated without the effect of the field lines.

The overspray-free print heads, on the other hand, are preferably used for painting the outer surfaces of the components to be painted, while the overspray-generating atomizers can be used for painting the inner surfaces of the components to be painted or for painting the above-mentioned wrap-arounds at the edges of the components.

In the painting installation according to the disclosure, the first paint booth with the overspray-free print heads can be arranged at floor level without the steel construction described above, especially directly on a floor foundation. The renunciation of a paint separation thus also allows the combination of overspray-free print heads with overspray-generating atomizers in a painting line to dispense with the steel construction described above and thus enables the arrangement of the at least one overspray-free paint booth directly on a floor foundation which is arranged at the level of the grating of the paint booth with overspray separation. Accordingly, the conveyor for conveying the components to be painted can also be arranged at floor level and, in particular, directly on the floor foundation, which is also advantageous.

It should be mentioned here that the conveyor can run at floor level over the entire length of the painting installation.

Alternatively, it is also possible that the first paint booth with the overspray-free print heads as application device is arranged at floor level, whereas the other paint booths with the atomizers as application device are arranged in the conventional way above a paint separation. In this case, the components to be painted must be lowered or raised as they pass through the painting line. The painting line can run on an upper assembly level, as is known from the state of the art. If the paint booth with the overspray-free print heads is now arranged at floor level, the components to be painted must be discharged from the upper paint line to the bottom and then returned to the top, which can be done using a lift, for example.

Alternatively, it is also possible for the paint booth with the overspray-free print heads to be located to the side of the actual main painting line, which, however, also requires the components to be painted to be introduced or discharged again.

In one example, the painting installation has an interior paint booth and an exterior paint booth, which are arranged one behind the other along the painting line and through which the components to be painted pass one after the other. In the interior paint booth, the inner surfaces of the components to be painted are painted. In the exterior paint booth, on the other hand, the exterior surfaces of the components to be painted are painted. The aforementioned wrap-around component edges are then painted either in the interior paint booth or in the exterior paint booth, so that these paint booths have an extended painting scope.

It should also be mentioned that the painting line preferably has a certain cycle time with which the components to be painted are coated. The cycle time of the paint booth with the overspray-free print heads is then preferably longer than the cycle time of the main painting line, for example by 10%, 20%, 50%, 100%, 200%, 300% or 500%. Alternatively, it is also possible that the cycle time of the paint booth with the overspray-free print heads is equal to or less than the cycle time of the main spray line.

In a preferred example of the disclosure, in the paint booth with overspray-free print heads, i.e. without paint separation, only rare special paints or decorative paints are applied, whereas frequent standard paints are painted with atomizers in the general painting line. In addition, primers, adhesion promoters or seam sealing (NAD: Nahtabdichtung) can also be applied in the paint booth with the overspray-free print heads.

In one example, the painting installation has the following painting stations (e.g. paint booths) which are arranged one behind the other along a painting line so that the components to be painted are conveyed through the stations one after the other in a filling process:

- A first filler station for the application of a filler layer in the interior of the component and at the wrap around component edges, whereby the application in the first filler station takes place using an atomizer (e.g. rotary atomizer) and the wrap also extends to outer surfaces.
- A second filler station for applying a filler layer to the outer surface of the component, the application in the second filler station using an overspray-free applicator, in particular with a print head.
- A first drying station for drying the filler layer on the component.
- A first base coat station for applying a first base coat layer to the inner surface of the component to be coated and around the edges of the component at the wrap around, the application in the first base coat station using an atomizer which emits a spray jet and the wrap-around also extends to outer surfaces.
- A second base coat station for applying the first base coat layer to the outer surface of the component to be coated, the application being carried out in the second base coat layer with an overspray-free applicator.
- A third base coat station for applying a second base coat layer to the outer surface of the component to be painted, the application being carried out in the third base coat station by an overspray-free applicator or by an atomizer.
- A second drying station for intermediate drying of the first base coat layer and the second base coat layer.
- A first clear coat station for the application of a clear coat layer in the interior of the component and at the wrap-around component edges, the application in the first clear coat station being carried out by an atomizer which emits a spray mist of the clear coat and the wrap-around also extends to outer surfaces.
- A second clear coat station for applying a clear coat layer to the outer surface of the component to be coated, the application being carried out in the second clear coat station by an overspray-free applicator, in particular by a print head.
- A third drying station for drying the clear coat layer.

In another example, a fillerless process is used. Instead of the filler application described above, in the first two stations a precoat or a so-called BC0=BC zero (a base coat applied before the actual first base coat, which can be done using an overspray-free print head) is optionally used.

In a further example, a so-called “3-wet process” is provided. A filler is optionally applied in a first station, which can be done by means of a conventional atomizer. It should be mentioned here that a wrap-around is required for all paint layers. The remaining steps then correspond to the steps described above with the exception of the 3-wet process.

In a variant of the disclosure, it is provided to first apply a first base coat layer instead of the filler. A second base coat can then optionally be applied as a top coat and optionally with a metallic effect. Finally, a clear coat can be applied. This, too, is preferably a primerless coating process.

The following process steps are provided in a further example of a fillerless painting process:

Application of a precoat with a filler function,

Application of a first base coat as top coat,

Application of a second base coat as top coat,

Application of a clear coat.

Furthermore, the painting installation according to the disclosure is very suitable for decorative painting. A base coat can first be applied to the component to be painted, which can be done using a conventional atomizer. The desired decor (e.g. graphic) can then be applied to the component using an overspray-free application device. The decor is then protected with a clear coat layer.

Furthermore, the paint booth without paint separation comprises an air duct with a supply air duct and an exhaust air duct. The supply air duct can be realised as a supply air ceiling, while the exhaust air ducting can be designed as an exhaust air floor. Alternatively, the exhaust air duct can have exhaust air ducts on the floor, e.g. next to the body, under the body or on the cabin wall. However, the supply air could also come from ducts on the ceiling. The supply and exhaust air is also necessary without paint separation, as paint is still being applied to the car. For example, the solvents still have to be removed and the paint has to evaporate.

Figure 2A:
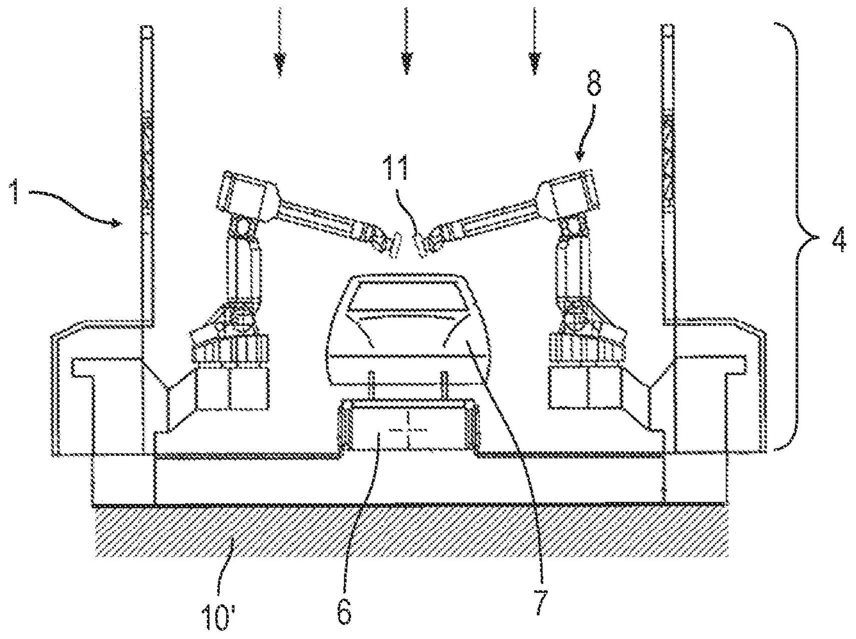

With reference to the figures, FIG. 2A shows a cross-sectional view of a paint booth 1 according to the disclosure, partially identical with the conventional paint booth 1 shown in FIG. 1, so that reference is made to the above description to avoid repetition, using the same reference marks for corresponding details.

A feature of this design example is that print heads 11, which are guided by the painting robots 8, are used as the application device instead of the rotary atomizers 9. The print heads 11, however, do not emit a spray of the paint to be applied, but a narrowly confined jet of coating agent and are therefore essentially free of overspray. This offers the advantage that the paint separation 3 can be dispensed with. Rather, there is only one exhaust air duct 12 below the paint booth 1, through which the downward air flow in the paint booth 1 can be discharged.

This renunciation of the paint separation 3, which is possible according to the disclosure, again makes it possible to dispense with the steel construction 5, so that the paint booth 1 can be mounted almost at floor level.

Figure 2B:
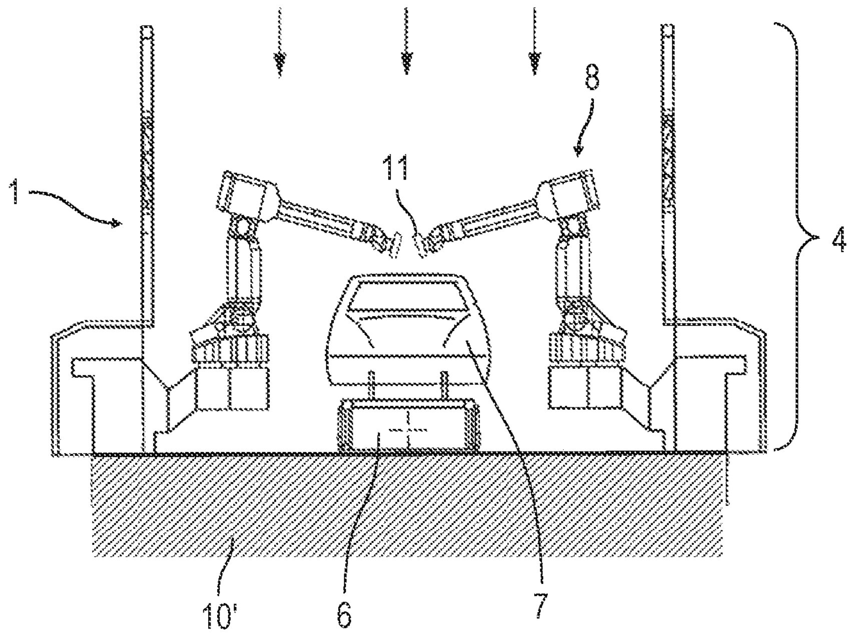

FIG. 2B shows another modification, so that to avoid repetitions, reference is made again to the above description, using the same reference symbols for corresponding details.

A special feature of this example is that the conveyor 6 for conveying the motor vehicle body components 7 is arranged directly on the concrete foundation 10'.

The painting installation according to the disclosure therefore only has to have a single floor, since no separate floor is required for the paint separation 3. This in turn allows the painting installation to be installed in relatively low halls. However, this only applies if overspray-free application equipment is used exclusively.

Figure 2C:
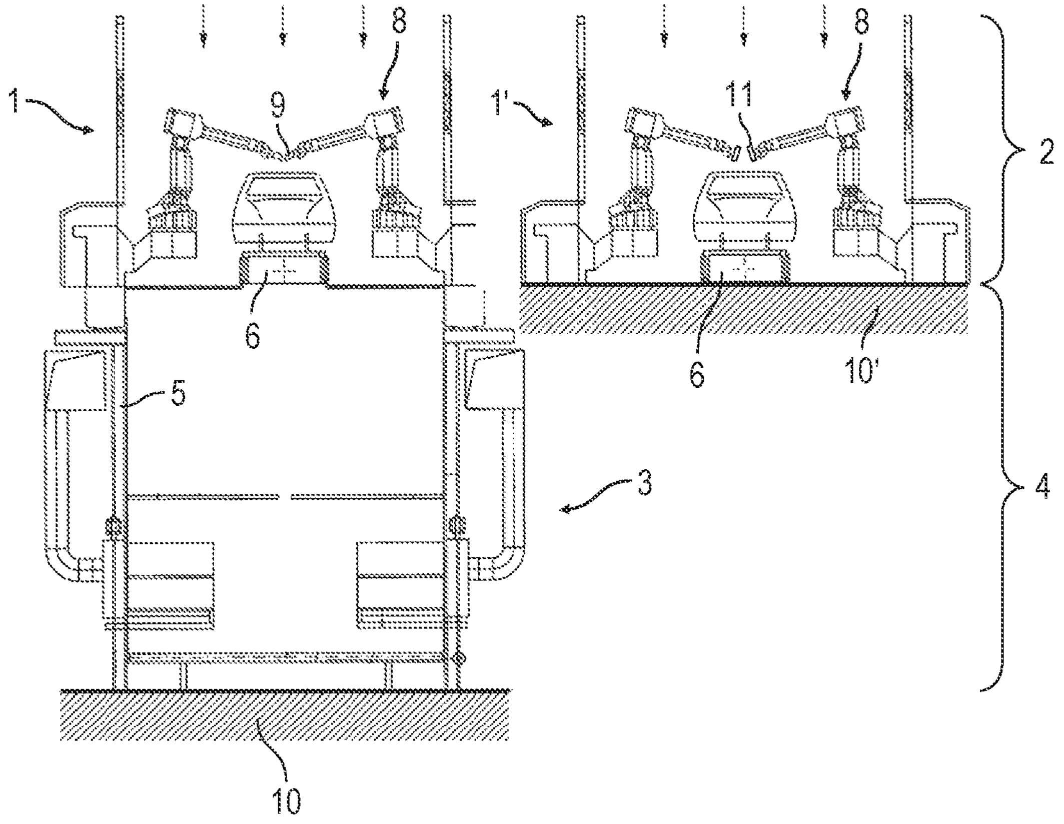

FIG. 2C shows a further modification so that the above description is referred to again in order to avoid repetitions, whereby the same reference symbols are used for corresponding details.

FIG. 2C, for example, shows a modification according to the disclosure in which an overspray-free paint booth 1' is connected to the paint booth 1 with the paint separation 3 (overspray separation). The concrete foundation 10' of the overspray-free paint booth 1' is arranged at the same height as the grating of the paint booth 1 with the paint separation 3 (overspray separation).

Figure 3:
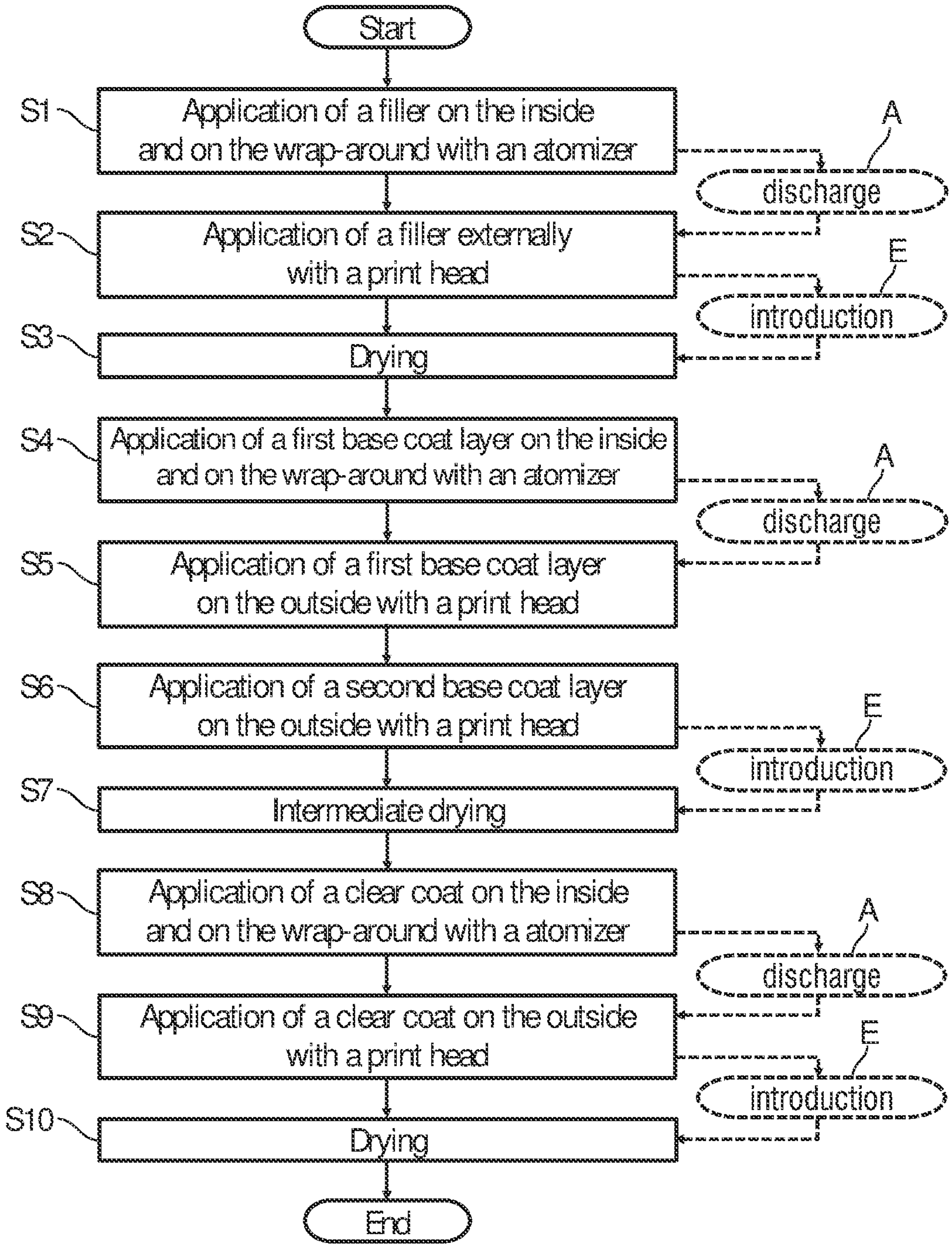
FIG. 3 shows an example of a painting method according to the disclosure in the form of a flow chart, FIG. 4 a modification of FIG. 3, FIG. 5 a modification of FIG. 3 with a 3-wet process, FIG. 6 another modification of a painting process according to the disclosure, FIG. 7 a modification of FIG. 6, FIG. 8 another modification, and FIG. 9 a schematic illustration of the painting of wraparounds around component edges.

FIG. 3 shows a flow chart to illustrate an example of a painting process according to the disclosure with a filler.

In a first step, S1, a filler is applied in the conventional way by means of a atomizer to the inner surfaces of the vehicle body components to be painted and around the edges of the component.

In a further step, S2, a filler is then applied to the outer surfaces of the vehicle body components to be painted using an overspray-free print head.

In the next step, S3, the vehicle body components are then dried.

A step S4 then provides for a first base coat layer to be applied to the inner surfaces of the vehicle body components and around the edges of the component by means of an atomizer.

In a further step, S5, a first base coat layer is applied to the outer surfaces of the vehicle body components using an overspray-free print head.

Step S6 then involves applying a second base coat layer to the outer surfaces of the vehicle body component using an overspray-free print head.

In a step S7, the vehicle body components are then dried.

A step S8 then provides for a clear coat to be applied to the inner surfaces and around the edges of the component by an atomizer.

In a further step, S9, a clear coat is then applied to the outer surfaces of the vehicle body components using an overspray-free print head.

In one step S10, the vehicle body components are then finally dried.

In a modification of this example, the entire painting line runs through all the painting cabins on an upper floor, so that there is no difference in height between the painting cabins with the atomizers and the painting cabins with the overspray-free print heads. The paint booths with the overspray-free print heads can then also have a steel or concrete construction so that these paint booths are at the same height level as the other paint booths with the overspray-generating atomizers. The paint booths with the overspray-free print heads can also be installed on solid false ceilings and/or without recesses or basements.

In another modification of the disclosure, the paint booths with the overspray-free print heads are lowered, since they do not require paint separation. In this case, it is necessary to overcome the difference in height, which is done by means of a discharge A or an infeed E. This discharge A or the infeed E from the elevated painting line or into the elevated painting line can be carried out, for example, by means of a lift.

Figure 4:
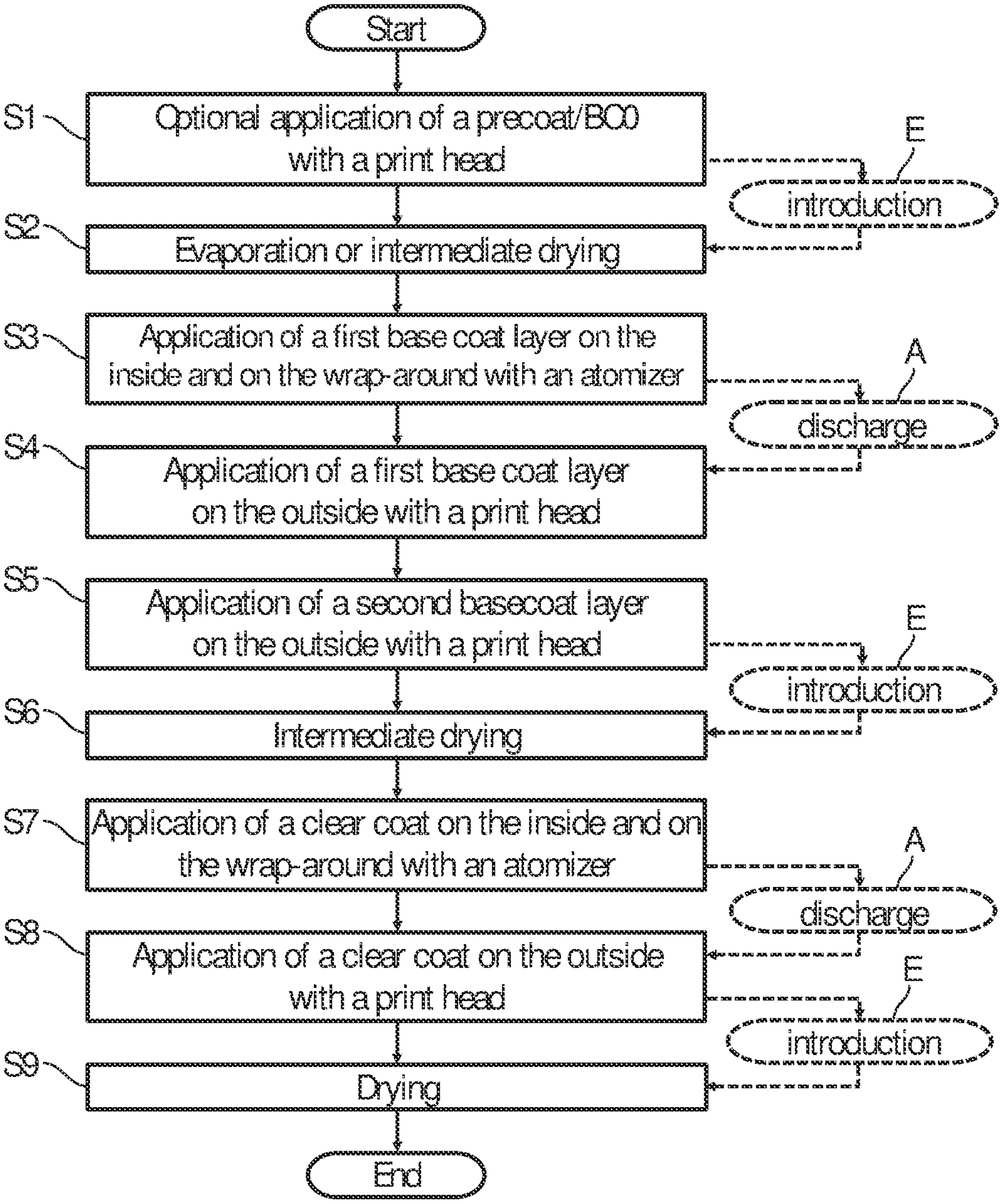

FIG. 4 shows a modification of the example according to FIG. 3, so that to avoid repetitions, reference is made to the above description, using the same reference signs for corresponding details.

A feature of this example is that it is a primerless painting process. In step S1, therefore, no filler is applied, but a precoat or a BC0, which can be done using a print head. Furthermore, in step S2, either evaporation or intermediate drying takes place.

Otherwise, this painting process essentially corresponds to the painting process described above and shown in FIG. 3.

Figure 5:
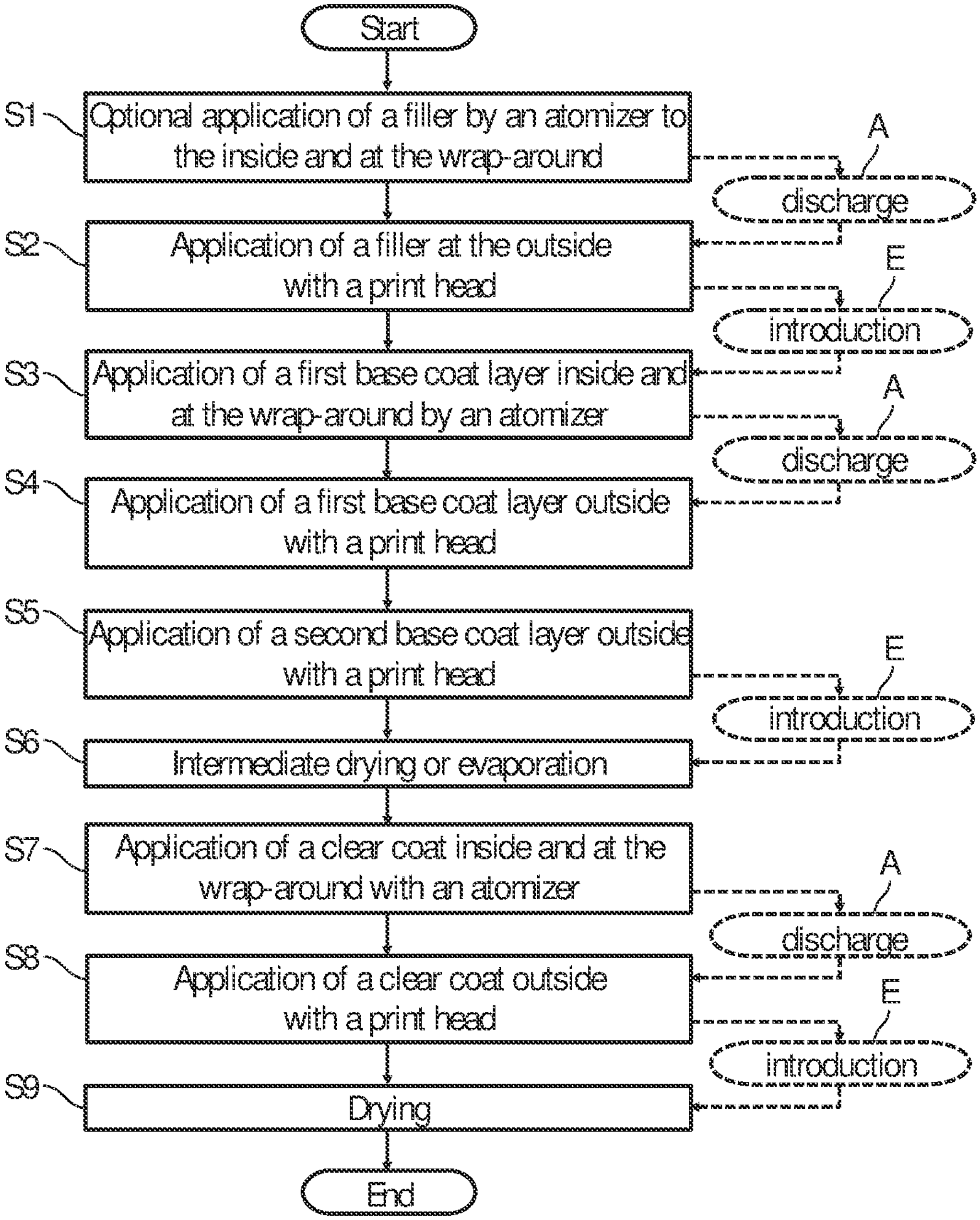

FIG. 5 shows a further modification, which in turn partially corresponds to the examples given in FIGS. 3 and 4, so that reference is made to the above description in order to avoid repetitions, whereby the same reference signs are used for corresponding details.

A feature of this example is that it is a so-called 3-wet process. In the first step, a filler is optionally applied inside and on the wrap-around by means of a atomizer.

In the second step, S2, a filler is then applied to the outer surfaces of the vehicle body components, which can be done using an overspray-free print head.

The further procedural steps again essentially correspond to the procedural steps described above, so that reference is made to the above description in this regard.

Figure 6:
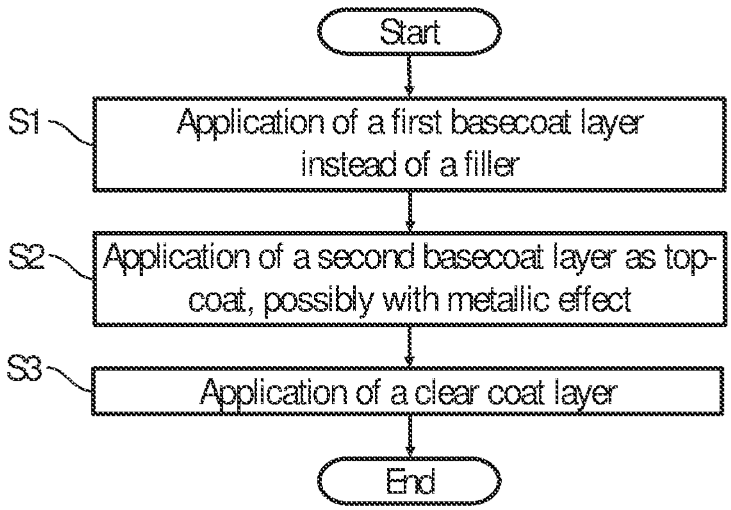

FIG. 6 shows another simple example. In the first step S1, a first base coat layer is applied instead of a filler, i.e. the base coat layer also has a filler function. In a second step, S2, a second base coat layer is applied, which can also have a metallic effect. Finally, a clear coat layer is applied in step S3.

Figure 7:
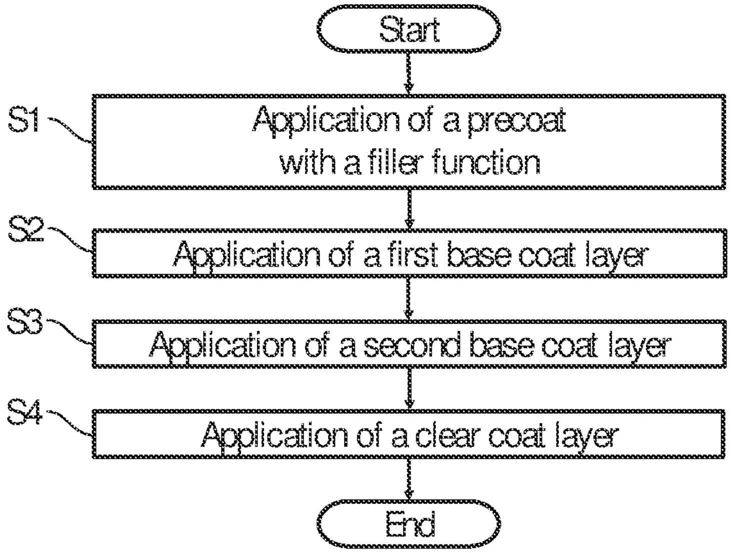

FIG. 7 shows another example of a coating process based on the disclosure. In a first step S1, a precoat with a filler function is applied. A first base coat layer is then applied in step S2 and a second base coat layer in step S3. Finally, a clear coat layer is applied in step S4.

Figure 8:
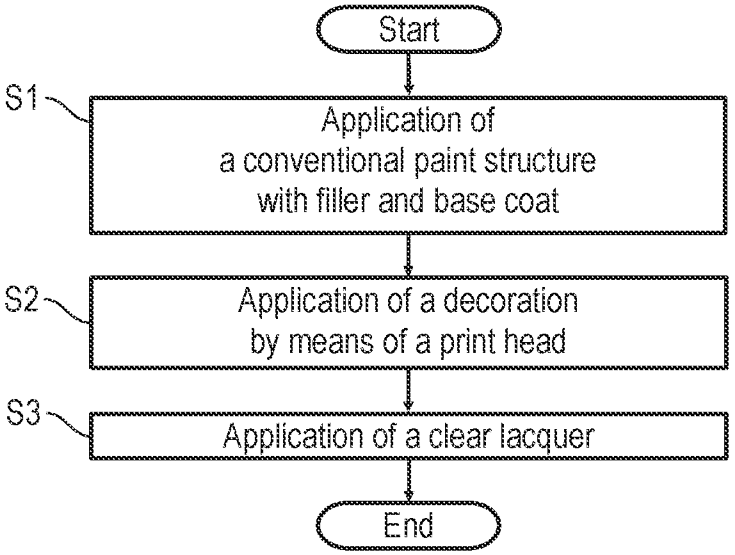

In the example shown in FIG. 8, a conventional paint structure with filler and base coat is first applied using an atomizer. In one step S2, a decor is then applied, which can be done using an overspray-free print head. Then a clear coat layer is applied.

Figure 9:
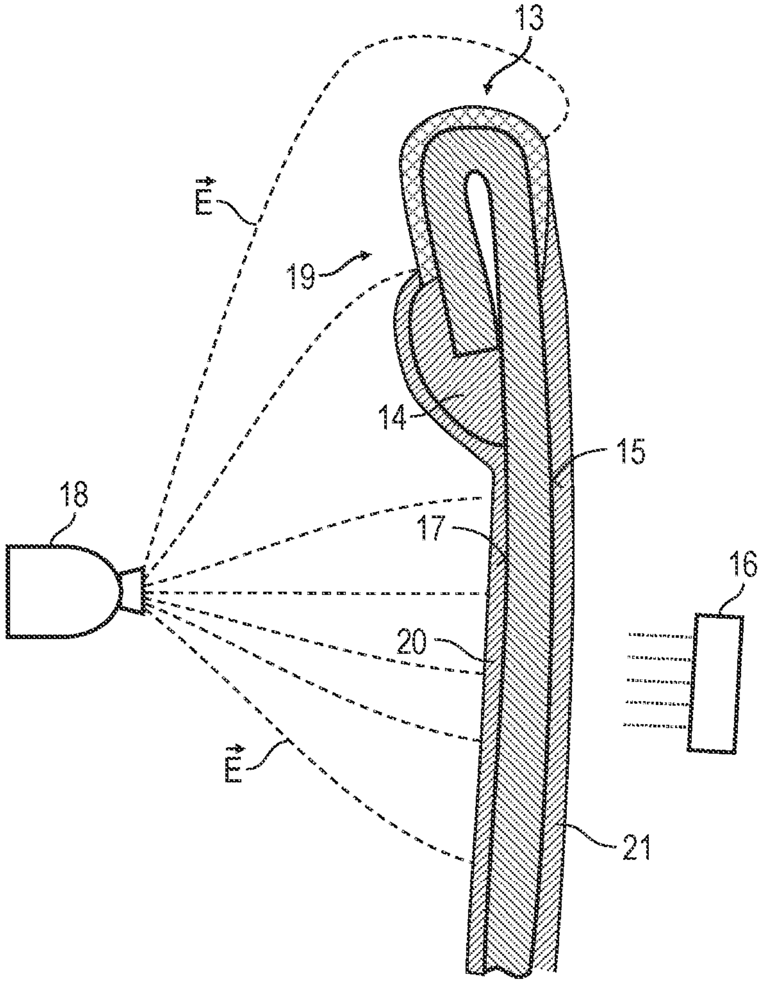

FIG. 9 shows a simplified and schematic cross-sectional view through a component edge 13 of a component, such as a car body component. The component edge 30 is flanged and sealed with a flange seam seal 14. The outer surfaces 15 of the motor vehicle body component are coated with a paint layer 21 by an overspray-free print head 16, while the inner surfaces 17 of the component are coated with a paint layer 20 by a conventional atomizer 18. In addition, the component edge 13 is coated with the paint layer 19, which is also applied by the atomizer 18, by the electrostatic wrap-around.

The coating of the wrap-around area and the component edge 13 with the atomizer 18 instead of the print head 16 is advantageous, since the coating of extremely strongly curved surfaces with a very small radius of curvature with the print heads 16 is so far only very badly possible.

The disclosure is not limited to the preferred examples described above. Rather, a large number of variants and modifications are possible which also make use of the idea of the disclosure and therefore fall within the scope of protection.

LIST OF REFERENCE SIGNS

1 Paint booth
2 Upper floor
3 Paint separation
4 Lower floor
5 Steel construction
6 Conveyors
7 Motor vehicle body components
8 Painting robots
9 Rotary atomizers
10 Concrete foundation
10' Concrete foundation
11 Print head
12 Exhaust air duct
13 Component edge
14 Flanged seam sealing
15 Outer surface
16 Print head
17 Inner surfaces
18 Atomizer
19 Wrap-around
20 Paint layer on inner surfaces
21 Paint layer on outer surfaces
E Electrostatic field lines

The invention claimed is:

1. A method for painting components with a paint using a painting installation, the method comprising:
- conveying a component into a first paint booth;
- applying at least one of adhesion promoter or seam sealings in the first paint booth;
- applying paint to the component with a print head of a first application device arranged in the first paint booth, the print head emitting a droplet jet or a continuous jet of coating medium;
- conveying the component into a second paint booth; and
- applying paint to the component with an overspray-generating atomizer of a second application device arranged in the second paint booth, the overspray-generating atomizer emitting a spray of coating medium.

2. The method of claim 1, wherein applying paint to the component with the first application device arranged in the first paint booth includes applying paint to outer surfaces of the component and applying paint to the component with the overspray-generating atomizer of the second application device arranged in the second paint booth includes applying paint to inner surfaces of the component.

3. The method of claim 2, wherein the method further includes applying paint to wraps around component edges of the component with an atomizer which applies a spray mist of the paint.

4. The method of claim 1, wherein applying paint to the component with the first application device arranged in the first paint booth includes applying a first paint and wherein applying paint to the component with the second application device arranged in the second paint booth includes applying a second paint that is different than the first paint.

5. The method of claim 4, wherein no paint is applied to the component with the first application device arranged in the first paint other than the first paint.

6. The method of claim 1, wherein applying paint to the component with the overspray-generating atomizer of the second application device arranged in the second paint booth includes applying a base coat layer and a clear coat layer.

7. A method for painting components with a paint using a painting installation, the method comprising:
- applying a first filler layer to an interior and wrap-around edges of a component at a first filler station with an atomizer which applies a spray mist;
- applying a second filler layer to an outer surface of the component at a second filler station with a print head emitting a droplet jet or a continuous jet of coating medium;
- drying the first filler layer and the second filler layer at a first drying station;
- applying a first base coat layer to the interior and wrap-around edges of the component at a first base coat station with an atomizer which applies a spray mist;
- applying a second base coat layer to the outer surface of the component at a second base coat station with a print head emitting a droplet jet or a continuous jet of coating medium;
- applying a third base coat layer to the outer surface of the component at a third base coat station with an atomizer which applies a spray mist or a print head emitting a droplet jet or a continuous jet of coating medium;

drying the first base coat layer, the second base coat layer and the third base coat layer at a second drying station;

applying a first clear coat layer to the interior and wrap-around edges of the component at a first clear coat station with an atomizer which applies a spray mist;

applying a second clear coat layer to the outer surface of the component at a second clear coat station with a print head emitting a droplet jet or a continuous jet of coating medium; and drying the first clear coat layer and the second clear coat layer at a third drying station.

8. The method of claim 7, wherein the second filler layer is applied to the outer surface of the component before drying the first filler layer.

* * * * *